United States Patent
Calderara et al.

(10) Patent No.: US 12,241,168 B2
(45) Date of Patent: Mar. 4, 2025

(54) ELECTRODE FOR ELECTROCHEMICAL EVOLUTION OF HYDROGEN

(71) Applicant: INDUSTRIE DE NORA S.P.A., Milan (IT)

(72) Inventors: Alice Calderara, Milan (IT); Luciano Iacopetti, Milan (IT)

(73) Assignee: INDUSTRIE DE NORA S.P.A., Milan (IT)

( * ) Notice: Subject to any disclaimer, the term of this patent is extended or adjusted under 35 U.S.C. 154(b) by 131 days.

(21) Appl. No.: 17/763,534

(22) PCT Filed: Oct. 27, 2020

(86) PCT No.: PCT/EP2020/080130
§ 371 (c)(1),
(2) Date: Mar. 24, 2022

(87) PCT Pub. No.: WO2021/083862
PCT Pub. Date: May 6, 2021

(65) Prior Publication Data
US 2022/0349074 A1    Nov. 3, 2022

(30) Foreign Application Priority Data
Oct. 30, 2019   (IT) .................. 102019000020026

(51) Int. Cl.
| | | |
|---|---|---|
| *C25B 11/00* | (2021.01) | |
| *C25B 1/04* | (2021.01) | |
| *C25B 9/19* | (2021.01) | |
| *C25B 11/089* | (2021.01) | |
| *C25B 13/00* | (2006.01) | |
| *C25B 11/042* | (2021.01) | |

(52) U.S. Cl.
CPC .............. *C25B 11/089* (2021.01); *C25B 1/04* (2013.01); *C25B 9/19* (2021.01); *C25B 13/00* (2013.01); *C25B 11/042* (2021.01)

(58) Field of Classification Search
CPC ........... C25B 11/089; C25B 9/19; C25B 1/04; C25B 13/00; C25B 11/042
See application file for complete search history.

(56) References Cited

U.S. PATENT DOCUMENTS

| | | |
|---|---|---|
| 3,990,957 A | 11/1976 | Hoekje et al. |
| 4,300,992 A | 11/1981 | Yoshida et al. |
| 4,507,183 A | 3/1985 | Thomas et al. |
| 2015/0240368 A1* | 8/2015 | Iacopetti ................... C25B 1/04 204/252 |

FOREIGN PATENT DOCUMENTS

| | | |
|---|---|---|
| CN | 104894595 A | 9/2015 |
| GB | 1260645 A | 1/1972 |
| WO | 2019175280 A1 | 9/2019 |

OTHER PUBLICATIONS

International Search Report and Written Opinion for Corresponding International Application No. PCT/EP2020/080130 (Dec. 11, 2020) (15 Pages).
Office Action for Corresponding Chinese Patent Application No. 202080074991.1 and English Translation, issued Jul. 5, 2023, 20 pages.

* cited by examiner

*Primary Examiner* — Zulmariam Mendez
(74) *Attorney, Agent, or Firm* — LUCAS & MERCANTI, LLP

(57) ABSTRACT

An electrode, having a catalytic coating containing ruthenium and at least one other element selected from the group of alkaline earth metals, suitable to be used in industrial electrochemical processes for hydrogen evolution and to a method for the production of the same. The catalytic coating has 93-99 wt-% of ruthenium and 1-7 wt-% of alkaline earth metals, referred to the metals.

8 Claims, No Drawings

ELECTRODE FOR ELECTROCHEMICAL EVOLUTION OF HYDROGEN

CROSS REFERENCE TO RELATED APPLICATION

This application is a U.S. national stage of PCT/EP2020/080130 filed on Oct. 27, 2020 which claims the benefit of priority from Italian Patent Application No. 102019000020026 filed Oct. 30, 2019, the contents of each of which are incorporated herein by reference.

FIELD OF THE INVENTION

The present invention relates to an electrode suitable to be used in industrial electrochemical processes for hydrogen evolution and to a method for its production.

BACKGROUND OF THE INVENTION

The present invention relates to an electrode suitable to be used in electrolytic processes, in particular to a cathode suitable for hydrogen evolution in an industrial electrolysis process. The electrolysis of alkali brines for the simultaneous production of chlorine and alkali and the water electrolysis processes are the most typical examples of industrial electrolytic applications with cathodic evolution of hydrogen, but the electrode is not limited to any particular use.

In the industry of the electrolytic processes as described above, competitiveness is associated to several factors, the main of which being the reduction of energy consumption, directly linked to the electrical voltage of the global process. In the membrane process of electrolysis of alkaline brines, for example, the global electrical voltage depends on factors associated with ohmic drop and mass transport, on the resistance of the ion exchange membrane and of the electrolyte and on the overvoltages of the chlorine and hydrogen gas evolution reactions.

In industrial practice these overvoltages are minimized and controlled through the use of appropriate catalysts applied on the electrodes where the electrochemical reaction takes place; for this purpose, it is possible to use, for example, cathodes consisting of metallic substrates, such as nickel, nickel alloy, copper or steel, provided with catalytic coatings based on ruthenium dioxides.

Cathodes of this type are generally characterized by excellent cathodic overvoltages; however, they have limited life times, probably due to the poor adhesion of the coating to the substrate. Furthermore, these types of coatings let completely unsolved the problem of resistance to current inversions that occur in industrial electrolysers in the event of plant shutdowns. A partial improvement in the adhesion of the catalytic coating on the substrates can be obtained with the addition of elements from the group of rare earths, such as praseodymium, cerium or lanthanum, to the formulation of the catalytic layer. The cathodes having these coatings prove to be sufficiently resistant under normal operating conditions. It is then possible to increase the strength of these electrodes by interposing a platinum-based layer between the metal substrate and the catalytic coating.

A further improvement in the resistance to current inversions can be obtained by applying a catalytic coating to the metal substrate consisting of two distinct phases, a first phase based on platinum and rhodium and a second phase comprising palladium having a protective function. However, this type of formulation requires high loads of platinum and rhodium in the catalytic phase, such as to determine a rather high production cost.

U.S. Pat. No. 3,990,957 A describes a gas-evolving cathode for electrolyzing an aqueous alkali metal chloride electrolyte. The cathode comprises a catalytic layer of an oxy-compound of a perovskite forming platinum group metal and an alkaline earth metal on an electroconductive substrate. Typical oxy-compounds include calcium ruthenate or strontium ruthenate.

WO 2019/175280 A1 describes an electrode for electrochlorination processes comprising an active layer provided with a doped Ru—Ti catalytic composition.

U.S. Pat. No. 4,300,992 A describes an activated cathode for use in aqueous solution electrolysis comprising a metal base plate and a metal oxide layer formed on the surface of the base plate consisting of an oxide of ruthenium and an oxide of, e.g. calcium, magnesium, strontium, barium or zinc and of chromium, molybdenum, tungsten, selenium or tellurium. GB 1 260 645 A describes an electroconductive anode having a coating comprising an electroconductive oxy-compound including a platinum metal and an alkaline earth metal or a rare earth metal.

The present invention has the purpose of solving the problems described above and concerns a cathode characterized by a low hydrogen overvoltage and by a good resistance to the current inversion when the electrolysis is interrupted. The invention also relates to a method for producing the same and an electrolyzer that contains it.

SUMMARY OF THE INVENTION

Various aspects of the invention are set out in the accompanying claims.

Under a first aspect, the present invention relates to an electrode comprising an electrically conductive substrate equipped with at least one catalytic coating comprising ruthenium and at least one other element selected from the group of alkaline earth metals. The inventors have surprisingly observed that the addition of elements belonging to the group of alkaline earth metals to catalytic coatings comprising mainly ruthenium, allows to obtain unexpectedly improved performances in terms of catalytic activity for the hydrogen evolution reaction.

It is to be understood that the elements present in the catalytic coating can be in metallic form or in the form of oxides.

The catalytic coating described above comprises 93-99% of ruthenium by weight (i.e 93-99 wt-%) and 1-7% by weight (i.e. 1-7 wt-%) of a metal chosen from the group of alkaline earth metals, referred to the metals. This allows a further improvement of the hydrogen overvoltage.

The inventors have also found that such a catalytic coating allows the achievement of cell performances to a steady state in a time well below that is generally observed with other formulations of the known art.

Without wishing to limit the invention to any particular theory, this may be due to the fact that modest percentages of alkaline earth metals in the catalytic coating combine with transition metal oxides to form specific structures that modify the stoichiometry of the resulting oxide, making it more active.

According to a further embodiment, the invention relates to an electrode wherein the alkaline earth metal is chosen between strontium, calcium and barium.

The inventors have observed that formulations of this type provide better resistance to current inversions, on one hand, in respect to prior art formulations based on ruthenium dioxide only, and comparable, on the other hand, to formulations comprising noble metals, such as for example ruthenium, and rare earths, but with specific loads of noble metal substantially reduced. Indeed, a reduced specific consumption of the electrode has been surprisingly observed, expressed in percentage of the quantity of noble metal consumed, which indicates an excellent resistance to current inversions. The inventors have found that alkaline earth metals such as strontium, calcium and barium seem to stabilize the noble metal.

In a further embodiment, the catalytic coating has a specific load of ruthenium between 5 and 15 g/m$^2$. The inventors have found that, in the case of the indicated catalytic coating, reduced ruthenium loads are more than sufficient to impart a good resistance to current inversions combined with an excellent catalytic activity not found in the prior art of ruthenium-based catalytic coatings.

In a further embodiment of the electrode according to the invention, the preferred conductive substrate is nickel.

In a further aspect, the present invention relates to a method for the preparation of an electrode for evolution of gaseous products in electrolytic cells, for example for hydrogen evolution in electrolysis cells of alkaline brines or water electrolysis, comprising the following steps:
  (a) application to a conductive substrate of a solution containing the precursors of ruthenium and of said metal selected from the group of alkaline earth metals;
  (b) subsequent drying at 30-80° C. and thermal decomposition at 450-600° C.;

repetition of stages (a) and (b) until obtaining a catalytic coating with a specific load of ruthenium between 5 and 15 g/m$^2$. The precursor solution comprises ruthenium and alkaline earth metals in a concentration, which allows obtaining the above-described electrode coating. Accordingly, the precursor solution comprises 93-99 wt-% of ruthenium and 1-7 wt-% of the metal selected from the group of alkaline earth metals, referred to the metals.

According to an embodiment of the above method, said method comprises an initial treatment step prior to step (a), wherein said initial treatment step comprises a heat treatment of said conductive substrate for a time of not less than 15 minutes and a temperature not lower than 450° C.

In a further aspect, the invention relates to a cell for the electrolysis of alkaline chloride solutions comprising an anodic compartment and a cathodic compartment, separated by an ion exchange membrane or by a diaphragm where the cathodic compartment is equipped with an electrode as described in one of the forms above, used as cathode for hydrogen evolution.

In a further aspect, the invention relates to an electrolyser for the production of chlorine and alkali from alkaline brine comprising a modular arrangement of the electrolytic cells with the anodic and cathodic compartments separated by ion exchange membranes or diaphragms, where the cathodic compartment comprises an electrode in one of the forms as described above used as a cathode.

In a further aspect, the invention relates to an electrolyser for the production of hydrogen by electrolysis of water comprising an anodic compartment and a cathodic compartment separated by a diaphragm wherein the cathodic compartment is equipped with an electrode in one of the forms as described above.

The following examples are included to demonstrate particular embodiments of the invention, the practicability of which has been widely verified in the field of claimed values. It will remain clear to the person skilled in the art that the compositions and techniques described in the examples below represent compositions and techniques of which the inventors have found good functioning in the practice of the invention; however, the person skilled in the art will also appreciate that in the light of the present description, different changes can be made to the various embodiments described still giving rise to identical or similar results without departing from the scope of the invention.

EXAMPLE 1

A nickel mesh of dimensions 100 mm×100 mm×0.89 mm was subjected to a sandblasting process with corundum, etching in HCl and stress relieving through heat treatment according to the procedure known in the art. 100 ml of a solution containing ruthenium and strontium precursors having a composition expressed as a percentage by weight equal to 95% Ru and 5% Sr, referred to the metals, were prepared.

The solution was then applied to the nickel mesh by brushing in 6 coats.

After each coat, drying was carried out at 40-60° C. for about 10 minutes, then a heat treatment of 10 minutes at 500° C. The mesh was air-cooled each time before applying the next coat.

The procedure was repeated until a total load of Ru equal to 8 g/m$^2$ was reached. The electrode thus obtained was identified as sample E1

EXAMPLE 2

A nickel mesh of dimensions 100 mm×100 mm×0.89 mm was subjected to a sandblasting process with corundum, etching in HCl and stress relieving through heat treatment according to the procedure known in the art.

100 ml of a solution containing ruthenium and strontium precursors having a composition expressed as a percentage by weight equal to 97% Ru and 3% Sr, referred to the metals, were prepared.

The solution was then applied to the nickel mesh by brushing in 6 coats.

After each coat, drying was carried out at 40-60° C. for about 10 minutes, then a heat treatment of 10 minutes at 500° C. The mesh was air-cooled each time before applying the next coat.

The procedure was repeated until a total load of Ru equal to 11 g/m$^2$ was reached.

The electrode thus obtained was identified as sample E2

EXAMPLE 3

A nickel mesh of dimensions 100 mm×100 mm×0.89 mm was subjected to a sandblasting process with corundum, etching in HCl and stress relieving through heat treatment according to the procedure known in the art.

100 ml of a solution containing ruthenium and strontium precursors having a composition expressed as a percentage by weight equal to 96% Ru and 4% Sr, referred to the metals, were prepared.

The solution was then applied to the nickel mesh by brushing in 6 coats.

After each coat, drying was carried out at 40-60° C. for about 10 minutes, then a heat treatment of 10 minutes at 500° C. The mesh was air-cooled each time before applying the next coat.

The procedure was repeated until a total load of Ru equal to 7 g/m² was reached.

The electrode thus obtained was identified as sample E3.

COUNTEREXAMPLE 1

A nickel mesh of dimensions 100 mm×100 mm×0.89 mm was subjected to a sandblasting process with corundum, etching in HCl and stress relieving through heat treatment according to the procedure known in the art. 100 ml of a solution containing ruthenium and praseodymium precursors having a composition expressed as a percentage by weight equal to 83% Ru and 17% Pr, referred to the metals, were prepared.

The solution was then applied to the nickel mesh by brushing in 8 coats.

After each coat, drying was carried out at 40-60° C. for about 10 minutes, then a heat treatment of 10 minutes at 500° C. The mesh was air-cooled each time before applying the next coat.

The procedure was repeated until a total load of Ru equal to 11 g/m² was reached.

The electrode thus obtained was identified as CE1 sample

COUNTEREXAMPLE 2

A nickel mesh of dimensions 100 mm×100 mm×0.89 mm was subjected to a sandblasting process with corundum, etching in HCl and stress relieving through heat treatment according to the procedure known in the art.

100 ml of a solution containing ruthenium and praseodymium precursors having a composition expressed as a percentage by weight equal to 83% Ru and 17% Pr, referred to the metals, were prepared.

The solution was then applied to the nickel mesh by brushing in 10 coats.

After each coat, drying was carried out at 40-60° C. for about 10 minutes, then a heat treatment of 10 minutes at 500° C. The mesh was air-cooled each time before applying the next coat.

The procedure was repeated until a total load of Ru equal to 11.5 g/m² was reached. The electrode thus obtained was identified as CE2 sample.

COUNTEREXAMPLE 3

A nickel mesh of dimensions 100 mm×100 mm×0.89 mm was subjected to a sandblasting process with corundum, etching in HCl and stress relieving through heat treatment according to the procedure known in the art.

100 ml of a solution containing ruthenium precursor were prepared.

The solution was then applied to the nickel mesh by brushing in 14 coats.

After each coat, drying was carried out at 40-60° C. for about 10 minutes, then a heat treatment of 10 minutes at 500° C. The mesh was air-cooled each time before applying the next coat.

The procedure was repeated until a total load of Ru equal to 14 g/m² was reached.

The electrode thus obtained was identified as a CE3 sample

The samples of the examples described above were subjected to performances tests, under hydrogen evolution, in a laboratory cell fed with 32% NaOH at a temperature of 90° C., moreover some samples were subsequently subjected to cyclic voltammetry tests in the potential range from −1 to +0.5 V/NHE with a scan speed of 10 mV/s.

Table 1 shows the initial cathodic potential, corrected for the ohmic drop value, measured at a current density of 6 kA/m².

TABLE 1

| Samples | mV vs NHE |
|---------|-----------|
| E1 | 946 |
| E2 | 944 |
| E3 | 949 |
| CE1 | 968 |
| CE2 | 960 |
| CE3 | 980 |

Table 2 shows the initial cathodic potential and the cathodic potential after 25 cycles of cyclic voltammetry (25 CV), index of resistance to inversions, measured at a current density of 3 kA/m².

TABLE 2

| Samples | mV vs NHE | mV vs NHE (25CV) |
|---------|-----------|------------------|
| E1 | 915 | 1120 |
| CE2 | 925 | 1040 |
| CE3 | 930 | 1250 |

Table 3 shows the time to reach cell performance at steady state and the specific consumption of the electrode, expressed as a percentage of residual noble metal and further index of resistance to current inversions. The data were obtained using a laboratory membrane cell having an active cathodic area equal to 0.2 dm² at 8 kA/m² (accelerated test) after 4000 hours in activity (HOL). The test was performed with 210 g/l NaCl anolyte, 32% by weight NaOH catholyte, at T=89° C.

TABLE 3

| Samples | % Residual nobel metal load | Time to reach steady state |
|---------|-----------------------------|----------------------------|
| E1 | 80 | <3 days |
| CE2 | 80 | <7 days |
| CE3 | 60 | <5 days |

The previous description is not intended to limit the invention, which can be used according to different embodiments without departing from the purposes for this and whose scope is univocally defined by the attached claims.

In the description and the claims of the present application, the term "comprises" and "contains" and their variants as "comprising" and "containing" do not intend to exclude the presence of other additional elements, components or process steps.

The discussion of documents, documents, materials, apparatuses, articles and the like is included in the text for the sole purpose of providing a context to the present invention; however, it is not to be understood that this matter or part of it constituted general knowledge in the field relating to the invention before the priority date of each of the claims attached to this application.

The invention claimed is:

1. An electrode for gas evolution in electrochemical processes comprising an electrically conductive substrate and at least one catalytic coating comprising ruthenium and at least one other metal selected from the group of alkaline earth metals, wherein the catalytic coating comprises 93-99 wt-% of ruthenium and 1-7 wt-% of metal selected from the group of alkaline earth metals, referred to the metals, wherein the electrically conductive substrate is nickel or nickel alloy, and wherein the ruthenium and the alkaline earth metals in the catalytic coating are in metallic form or in the form of oxides.

2. The electrode according to claim 1 wherein the metal selected from the group of alkaline earth metals is strontium, calcium or barium.

3. The electrode according to claim 1 wherein the catalytic coating has a ruthenium load between 5 and 15 g/m$^2$.

4. A method for preparing the electrode as defined in claim 1, comprising the following steps:

a. applying, to a conductive substrate, a solution containing precursors of ruthenium and of said metal selected from the group of alkaline earth metals, said solution comprising 93-99 wt-% of ruthenium and 1-7 wt-% of said metal selected from the group of alkaline earth metals, referred to the metals;

b. subsequent drying at 30-80° C. and thermal decomposition at 450-600° C.;

c. repeating steps (a) and (b) until a catalytic coating is obtained with a specific ruthenium load between 5 and 15 g/m$^2$.

5. The method according to claim 4 comprising an initial treatment step preceding step (a), wherein said initial treatment step consists in the thermal treatment of said conductive substrate for a time not less than 15 minutes and at a temperature not lower than 450° C.

6. A cell for electrolysis of alkali chloride solutions comprising an anodic compartment and a cathodic compartment separated by an ion-exchange membrane or by a diaphragm, wherein the cathodic compartment is equipped with the electrode according to claim 1.

7. An electrolyzer for the production of chlorine and alkali starting from alkaline brine, comprising a modular arrangement of cells, wherein each cell is equipped according to claim 6.

8. An electrolyzer for the production of hydrogen by water electrolysis comprising an anodic compartment and a cathodic compartment separated by a diaphragm, wherein the cathodic compartment is equipped with an electrode according to claim 1.

\* \* \* \* \*